C. W. FELKER.
LAWN MOWER.
APPLICATION FILED MAY 7, 1909.

964,631.

Patented July 19, 1910.
2 SHEETS—SHEET 1.

WITNESSES:
R. E. Hamilton
E. B. House

INVENTOR.
Charles W. Felker
BY
Warren D. House
His ATTORNEY.

C. W. FELKER.
LAWN MOWER.
APPLICATION FILED MAY 7, 1909.
964,631.
Patented July 19, 1910.
2 SHEETS—SHEET 2.
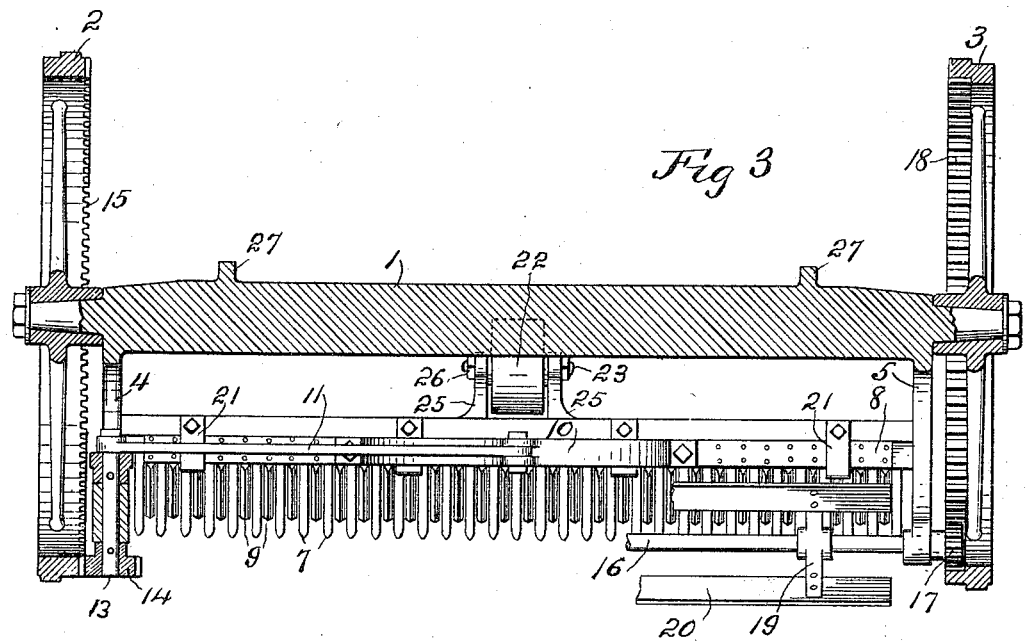
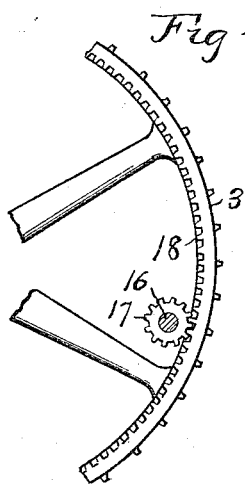
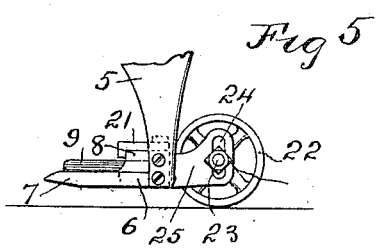
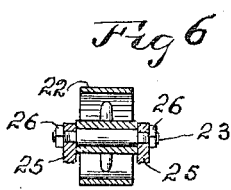
WITNESSES:
R. Hamilton
E. B. House
INVENTOR.
Charles W. Felker
BY Warren D. House
His ATTORNEY.

UNITED STATES PATENT OFFICE.

CHARLES W. FELKER, OF ARGENTINE, KANSAS.

LAWN-MOWER.

964,631.  Specification of Letters Patent.  Patented July 19, 1910.

Application filed May 7, 1909. Serial No. 494,542.

*To all whom it may concern:*

Be it known that I, CHARLES W. FELKER, a citizen of the United States, residing at Argentine, in the county of Wyandotte and State of Kansas, have invented certain new and useful Improvements in Lawn-Mowers, of which the following is a specification.

My invention relates to improvements in lawn mowers.

One of the objects of my invention is to provide a lawn mower that will readily cut grass of any height.

Another object of my invention is to provide a lawn mower with means by which the cut grass may be blown rearwardly from the grass cutting means.

Other novel features of my invention are hereinafter fully described and claimed.

Figure 1:
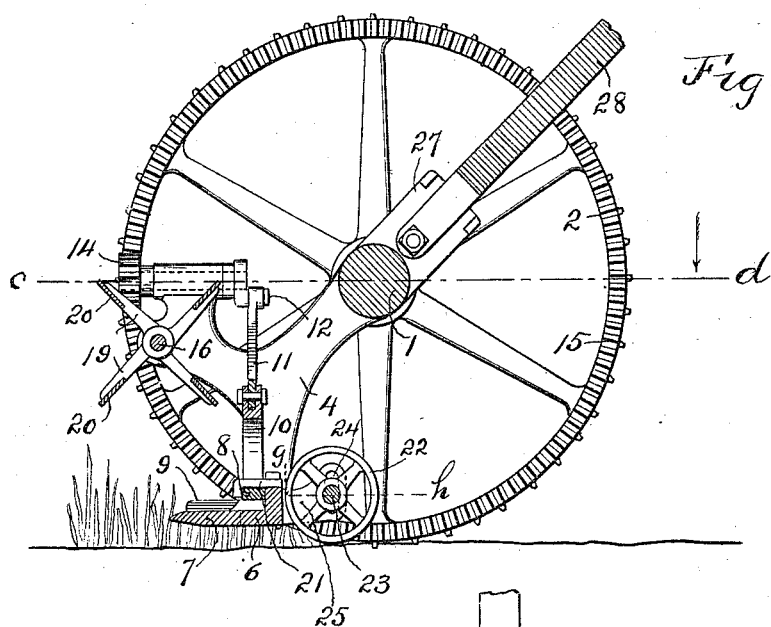
Figure 2:
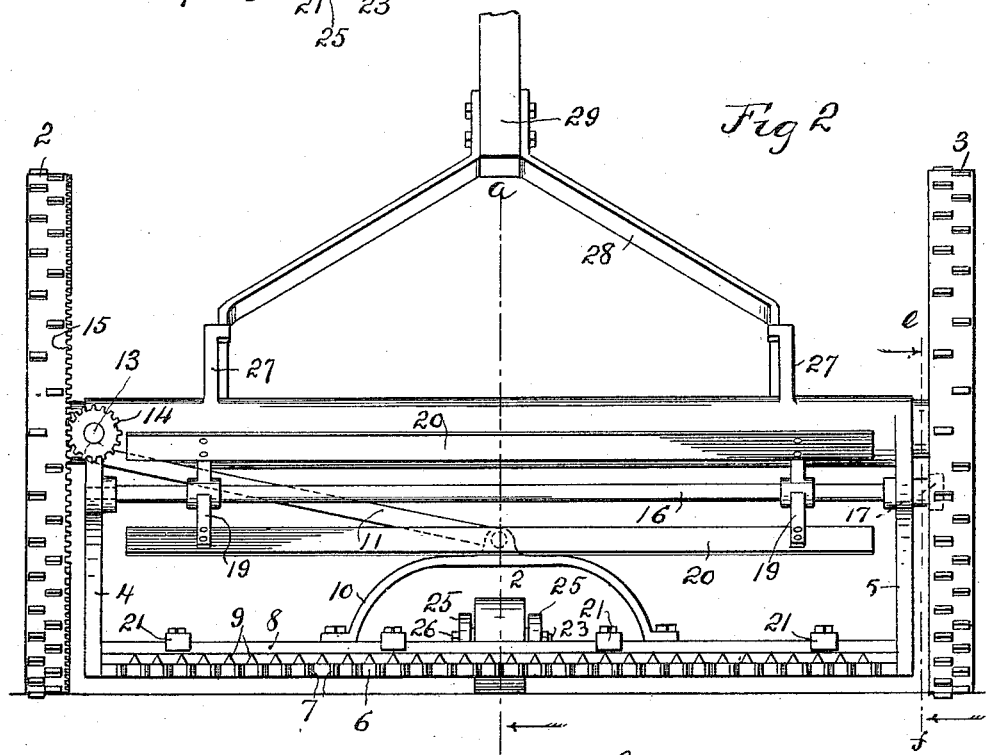

In the accompanying drawings which illustrate the preferred form of my invention—Figure 1 is a vertical sectional view, taken on the dotted line *a—b* of Fig. 2. Fig. 2 is a front elevation of my improved lawn mower. Fig. 3 is a horizontal sectional view, taken on the dotted line *c—d* of Fig. 1, some of the parts being broken away. Fig. 4 is a fragmental, vertical sectional view taken on the dotted line *e—f* of Fig. 2, looking in the direction denoted by the arrow, adjacent to said dotted line, which points to the right. Fig. 5 is a fragmental, vertical sectional view, taken on the dotted line *e—f* of Fig. 2, looking in the direction indicated by the arrow, which points to the left. Fig. 6 is a horizontal sectional view, taken on the dotted line *g—h* of Fig. 1.

Similar characters of reference denote similar parts.

1 denotes a horizontal axle upon which are rotatively mounted carrying wheels 2 and 3. The axle is provided with two parallel, downwardly extending arms, 4 and 5, to which is secured a horizontal bar 6, from the forward edge of which extend a plurality of horizontal cutting teeth 7. Upon the upper side of the toothed bar 6 is a sickle bar 8, which on its forward edge is provided with a plurality of horizontal cutting teeth 9, which rest upon and coöperate with the teeth 7 of the bar 6. The sickle bar 8 is reciprocatively mounted and has secured to its upper side a yoke 10, to which is pivotally secured one end of a pitman 11, the other end of which is secured to the crank 12 of a rotary horizontal shaft 13, mounted upon the arm 4. To the shaft 13 is secured a pinion 14, which meshes with a circular row of crown teeth 15, provided on the inner side of the rim of the carrying wheel 2.

To blow rearwardly the cut grass from the sickle bar 8, I provide a fan, preferably of the rotary type, the fan being operated by one of the carrying wheels. The fan which I have illustrated in the drawings is provided with a horizontal shaft 16, rotatively mounted in the arms 4 and 5, and having secured to it a pinion 17 which meshes with a circular row of internal gear teeth 18, provided on the inner periphery of the rim of the carrying wheel 3. On the shaft 16 are secured two hubs having radial arms 19 to which are secured respectively a series of horizontal paddles 20, disposed parallel with the shaft 16. The shaft 16 is disposed forward of and above the sickle bar 8 so that when the shaft is rotated by the forward movement of the lawn mower, the paddles 20 will blow cut grass rearwardly from the sickle bars 8. A series of horizontal plates 21 are secured at their rear ends to the upper side of the bar 6, above the sickle bar 8, their forward ends being downwardly turned over the forward edge of said sickle bar. The plates 21 serve as guides for the sickle bar. A small centrally disposed carrying wheel 22 is rotatively mounted on a horizontal bolt 23, as shown in Figs. 1, 2 and 5, said bolt being vertically adjustable in two slots 24, provided one in each of two rearwardly extending projections 25, on the rear side of the toothed bar 6. On the bolt 23 is provided at each end thereof, a nut 26. Said nuts bear respectively against the outer sides of the projections 25. By loosening one of the nuts 26 the bolt 23 may be vertically adjusted so as to lower or raise the teeth 7 of the bar 6. The axle 1 is provided with two rearwardly extending arms 27, to which are secured respectively, two arms 28, which in turn are rigidly secured to a handle 29, shown in Fig. 2, by which the axle 1 is tilted or moved forward or backward.

In operating my invention, when the machine is moved forward, the carrying wheel 2 will rotate the pinion 14, thereby rotating the crank shaft 13 and reciprocating the sickle bar 8 through the intermediacy of the pitman 11. When the mower is moved forward and the carrying wheel 3 revolved, the fan shaft 16 will be rotated by means of the pinion 17, thus causing the paddles 20 to blow grass cut by the sickle bar 8 rearwardly and out of the way of the knives 9 or teeth 7.

I do not confine my invention to the specific structure illustrated and described, as various modifications, within the scope of the appended claims, may be made without departing from the spirit of my invention.

Having thus described my invention, what I claim and desire to secure by Letters Patent is:—

1. In a lawn mower, the combination with two rotary carrying wheels, one of which is provided with a concentric circular row of teeth, of an axle supported by said carrying wheels, grass cutting means supported by said axle, means actuated by one of the carrying wheels for operating said cutting means, a fan having a rotary shaft disposed so that the fan will blow the cut grass rearwardly from said cutting means, and a pinion secured to said shaft and meshing with said teeth.

2. In a lawn mower, the combination with two rotary carrying wheels one of which is provided with a concentric circular row of teeth, of an axle supported by said carrying wheels, a reciprocative sickle bar, means for supporting said sickle bar from said axle, means actuated by one of said carrying wheels for reciprocating the sickle bar, a fan having a rotary shaft disposed so that the fan will blow cut grass rearwardly from said sickle bar, and a pinion secured to said shaft and meshing with said teeth.

3. In a lawn mower, the combination with two toothed carrying wheels, of an axle supported by said carrying wheels, two pinions meshing respectively with said toothed carrying wheels, a reciprocative sickle bar, means for supporting said sickle bar from said axle, a crank shaft secured to one of said pinions, a pitman connecting said crank shaft and sickle bar, and a fan having a rotary shaft disposed so that the fan will blow cut grass rearwardly from said sickle bar, said fan shaft being secured to the other of said pinions.

4. In a lawn mower, the combination with two rotary carrying wheels, each having a circular row of teeth, of an axle supported by said carrying wheels and having two arms, a horizontal toothed bar secured to said arms, a reciprocative sickle bar coöperating with said toothed bar, two pinions respectively meshing with said toothed carrying wheels, a crank shaft secured to one of said pinions, a pitman connecting said crank shaft and said sickle bar, and a fan having a shaft rotatively mounted in said arms and secured to the other pinion, the fan being disposed so as to blow cut grass rearwardly from said sickle bar.

5. In a lawn mower, the combination with an axle having two arms, of two carrying wheels rotatively mounted on said axle, each having a circular row of teeth concentric with said axle, a toothed bar secured horizontally to said arms, a carrying wheel mounted upon said toothed bar and vertically adjustable thereon, a reciprocative sickle bar coöperating with said toothed bar, a rotary crank shaft supported by one of said arms, a pitman connecting said crank shaft and said sickle bar, a fan having a shaft rotatively mounted in said arms and disposed so as to blow cut grass rearwardly from said sickle bar, and two pinions respectively secured to said shafts and respectively meshing with said toothed carrying wheels.

6. In a lawn mower, the combination with two carrying wheels, of an axle supported thereby and having two arms, a horizontal toothed bar secured to said arms, a handle secured to said axle for tilting the axle and moving it forward and backward, a vertically adjustable carrying wheel supporting said toothed bar, a reciprocative sickle bar coöperating with said toothed bar, a fan having a rotary shaft supported by said arms and disposed so as to blow cut grass rearwardly from said sickle bar, means actuated by one of said carrying wheels for rotating said shaft, and means actuated by one of said carrying wheels for reciprocating said sickle bar.

7. In a lawn mower, the combination with an axle provided with two forwardly extending arms, of two toothed carrying wheels rotative independently of each other on said axle, a reciprocative sickle bar carried by said two arms, a shaft having fan blades and rotatively mounted in said arms above said sickle bar and disposed parallel with said axle, a shaft rotatively mounted in one of said arms and disposed radially relative to said axle, and having a crank, a pitman connecting said crank and said sickle bar, and two pinions rigidly secured respectively to said shafts and meshing respectively with said toothed carrying wheels.

In testimony whereof I have signed my name to this specification in presence of two subscribing witnesses.

CHARLES W. FELKER.

Witnesses:
E. B. House,
E. J. Corcoran.